United States Patent [19]

Abbott et al.

[11] Patent Number: 4,901,928

[45] Date of Patent: Feb. 20, 1990

[54] PRESSURE HOSE HANDLE AND SYSTEM

[75] Inventors: Kenneth E. Abbott; Patrick J. Lyons; Richard M. Satariano, all of Tucson, Ariz.

[73] Assignee: Stripping Technologies Inc., Tucson, Ariz.

[21] Appl. No.: 253,237

[22] Filed: Oct. 4, 1988

[51] Int. Cl.[4] .............................................. B24C 5/02
[52] U.S. Cl. .................................... 239/530; 239/578; 239/587; 51/427; 51/439; 51/415
[58] Field of Search .......... 51/427, 439, 410, 319-321, 51/415; 239/530, 525, 587, 289, 152-154, 71, 74, 578; 16/110 R

[56] References Cited

U.S. PATENT DOCUMENTS

| 505,952 | 10/1893 | Norton | 239/587 |
| 672,164 | 4/1901 | Callahan | 239/530 |
| 1,829,621 | 10/1931 | Whiteford | 239/525 |
| 1,876,718 | 9/1932 | McPherson | 239/525 |
| 2,629,516 | 2/1953 | Badham | 239/289 |
| 3,543,444 | 12/1970 | Mehta | 51/427 |
| 3,784,804 | 1/1974 | Sabatelli et al. | 239/289 |
| 4,585,168 | 4/1986 | Even et al. | 239/74 |
| 4,731,125 | 3/1988 | Carr | 51/320 |

Primary Examiner—Robert Rose
Attorney, Agent, or Firm—Mark E. Ogram

[57] ABSTRACT

An improved pressure hose handle that rotates freely around a pressure hose and thereby eliminates hose torque being placed upon the operator. This reduces operator fatigue and permits the operator to more accurately control the pressure hose.

3 Claims, 2 Drawing Sheets

PRESSURE HOSE HANDLE AND SYSTEM

BACKGROUND

This invention relates generally to handles for pressurized hoses and more particularly to handles for blast hoses.

The application of pressurized material such as gas or liquid (sometimes referred to as medium) is well known and has been used for well over a century for such things as the removal of damaged paint and other coatings, removal of rust, impregnation of chemicals into substrates, cutting of substrates, and the conveying of selected materials for a broad variety of purposes.

Basically, the application requires a medium or a medium which is mixed with a selected material (sometimes referred to as media) to be conveyed under pressure. The medium or a mixture of the medium and selected media (such as a chemical or abrasive particles) can be used to treat, cut, or abrade a surface or target.

This basic approach has not changed since its inception more than a century ago; however, the surfaces or substrates to which the applications may apply have changed drastically. There now are topcoats and underlying substrates, such as plastics, composites, thin or exotic metals, and other surfaces, where this technology can be used in a beneficial manner. These new surfaces or substrates require the exercise of a great deal of care and skill to preclude damaging the surface, substrate, or other target.

Because of the care that must be taken, many inventions have focused on providing a handle which gives the operator greater mechanical control of the blasting head. These include U.S. Pat. No. 3,069,812, entitled "Sand Blasting Nozzle" issued Dec. 25, 1962, to Shelton-V; and U.S. Pat. No. 2,369,576, entitled "Blast Gun", issued Feb. 13, 1945, to Keefer.

In both of these situations, the handle provides for fixed mechanical control of the blast hose. The handle is attached to the end of the hose and extends downward in a "pistol grip" arrangement.

Although this does provide for good positive relationship between the operator's movement and the nozzle of the hose, the natural torque of the hose, accentuated due to the pressurization process, forces the operator to constantly "fight" or strain against the hose torque. This accelerates the operator fatigue problem and reduces the operator's responsiveness to variations in substrates or changes in target conditions. This can cause damage to the substrate or target.

Substrate material changes are very common in the modern world. A coated material that may appear to be of a common composition may have underlying areas of dissimilar material interposed throughout, and which are masked by a coating. A pressurized application of a medium or a mixture of medium and media that works well on one target, can cause damage when applied to other surfaces, substrates, or targets.

To compensate for this, several advancements in the technology have tried to place the mixing of the material at the handle. These advancements include U.S. Pat. No. 4,628,644, entitled "Abrasive Material Spraying Apparatus" issued Dec. 16, 1986, to Somers; U.S. Pat. No. 2,526,403, entitled "Abrasive Gun" issued Oct. 17, 1950, to Paasche; and U.S. Pat. No. 2,577,465, entitled "Sand Blast Gun" issued Dec. 4, 1951, to Jones et al.

In all of these applications, the added weight of the sand, abrasive material, or other material to be applied, causes even further operator fatigue since this weight must be swept and moved with the head of the pressurized hose.

In a commercial setting, these solutions are inoperable since the mass of material to be applied is so great, the operator could not physically move it. When a more manageable amount is placed at the spray head, the operator is forced to constantly stop and refill. This significantly handicaps the work through-put.

Another major concern related to the conveyance of medium or a mixture of medium and media under pressure is the safety issue. Operating a high pressure hose is very dangerous. Should something go wrong with the system or should even a minor accident occur such as an operator stumbling, the released pressure hose can cause damage to products and facilities as well as injure personnel.

Because of this, "dead-man" switches such as those described in U.S. Pat. No. 2,837,874, entitled "Sand Blasting Apparatus" issued June 10, 1958, to Hunter; or U.S. Pat. No. 2,753,664, entitled "Abrasive Blasting System" issued July 10, 1956, to Garver, were developed. In both situations, the dead-man switch is arranged at the handle. This is attached to the hose so to have normal operation, the operator depresses the dead-man switch. When the switch is depressed, the hose is pressurized and works normally. When the operator releases the switch, either intentionally or unintentionally, the hose cannot be pressurized. This eliminates the possibility of the hose being released from the operator's grasp while still being pressurized.

As with the aforementioned pistol grip, the dead-man switch forces the operator to maintain a fixed grip on the hose. This also forces the operator to fight the naturally occurring and significant torque, producing operator fatigue. Because of the fatiguing nature of the work, the operator cannot operate efficiently and therefore must take numerous breaks.

It is clear from the foregoing that an efficient handle and pressure application system does not exist which permits: (i) the optimal use of a pressurized hose system; and (ii) allows proper control of pressurized hose systems to address the various topcoats, substrates, and other targets encountered.

SUMMARY OF THE INVENTION

The present invention creates an operator's handle which rotates freely around the pressure hose. This permits the hose's natural torque to be expended in twisting the hose, rather than transfering the torque to the operator.

An added feature of the operator's handle is that it has a "reverse angle" grip, which forms an acute angle (less than ninety degrees) with the nozzle of the hose. This reverse angle permits the operator to rest the hose on his/her shoulder and to comfortably hold the handle while maintaining the weight of the hose with the operator's leg muscles.

Still another feature of the invention is its incorporation of a control panel at the operator's handle itself. This control panel permits the operator to selectively adjust, among other characteristics: (i) the pressure of the carrier medium (i.e. gas or liquid); or (ii) the mixture ratio of the medium and media (e.g. the number of abrasive particles per volume of air in an abrasive blasting application).

Although the discussion of this invention relates to the field of blasting, and in particular, to particle blasting, the invention is not to be so limited. The invention has applications to such diverse applications as fire fighting hoses, insecticide spraying, paint spraying, high viscosity coating applications, or high pressure cutting applications. Those of ordinary skill in the art readily recognize other areas where the advantages of the invention can be utilized.

In this context, blasting mechanisms may be of the many known to those skilled in the art as those described by U.S. Pat. No. 4,333,277, entitled "Combination Sand-Blasting and Vacuum Apparatus" issued June 8, 1982, to Tasedan; U.S. Pat. No. 4,045,915, entitled "Portable Sandblaster" issued Sept. 6, 1977, to Gilbert et al.; or U.S. Pat. No. 3,858,358, entitled "High Pressure Liquid and Abrasive Cleaning Apparatus" issued Jan. 7, 1975, to Stachowiak et al. Both patents are incorporated hereinto by reference.

One of the important features of the present invention is the creation of a "floating" or freely rotatable handle. This ability to rotate permits the torque of the hose to be harmlessly expended without affecting the operator. In fact, in most situations, the twisting of the hose due to the torque goes totally without notice on the part of the operator.

This rotational ability eliminates a major portion of the strain put upon the operator during normal operation of a blasting mechanism.

Numerous embodiments of this feature of the invention exist, including a simple sleeve being mounted over the pressure or blasting hose. The inside diameter of the sleeve must be greater than the outside diameter of the pressure hose.

During pressurization of the hose, there is a natural tendency of the hose to withdraw. To maintain the pressure hose's relative position and to secure the "floating" operator's handle, a stop at the nozzle end of the hose presses against the operator's handle. In the preferred embodiment of this invention, this stop is simply the nozzle of the pressure hose, such as described in U.S. Pat. No. 2,332,407, entitled "Nozzle Used for Sand Blasting Purpose", issued Oct. 9, 1943, to Spenle, incorporated hereinto by reference.

Other nozzles are obvious to those of ordinary skill in the art. The only qualification on the stop is that it is securely attached to the pressure hose and is not permitted to travel in a longitudinal manner along the hose.

Another feature of the present invention is the use of a reverse angle grip. This is a grip that forms an angle relative to the nozzle end of the hose of less than ninety degrees. In the preferred embodiment, this angle is twenty-seven degrees, but those of ordinary skill in the art recognize that other angles are also suitable.

The advantage of the reverse angle is that it permits, whereas a right angle or an obtuse angle precludes, the possibility of an operator carrying a pressure hose over his/her shoulder during operation. This shouldering ability is very important since it places the burden of supporting the heavy blast hose upon the operator's leg muscles. Otherwise, as is the current practice, the hose is cradled in the arms of the operator. Supporting the pressure hose with the arms causes excessive fatigue, whereas the shoulder carry utilizes the leg muscles for support and creates only minimal fatigue upon the operator.

The reverse angle, when combined with the rotation characteristic of the invention, also permits the operator to rotate the handle to place the operator's grip on the top of the handle, allowing waist height use of the pressure hose. Since the operator can choose and alternate between the shoulder carry and the waist high carry, fatigue is even further reduced.

Another important feature of the present invention is its incorporation of a control panel in the operator's handle. This permits the operator to adjust various parameters of a pressure system to accommodate different surfaces, substrates, and targets.

Different substrate topcoats, substrates, and even substrates of identical material but with varying thickness and age, require differing pressures and media mixture for optimum application. This may be due to the tenacity of the topcoat or changes in the substrates' chemical compositions, hardness, age, weathering background, and other factors. It is highly desirable that pressure, media mixture ratios and other pressure application variables be adjusted quickly and precisely at the blast head to preclude damage to substrates and other targets. This is of special importance in the removal of coatings from aircraft airframes, aerospace components, and other sensitive substrates such as advanced composites.

The operator, using his/her normal vision inspection or pressure monitoring devices while performing the pressure system application, can determine if the pressure is appropriate. Through easy manipulation of the control panel in the operator handle, the operator can adjust the pressure up or down until the optimum pressure is achieved.

This ability was not previously available. In order to adjust the pressure in the current art, the entire pressurized system had to be shut down for the operator to adjust it; alternatively, a second operator had to adjust the pressure at the pressure tank. In either approach, errors could be precipitated which could damage the substrate or target.

Additionally, because of the proximity of the operator to the actual work being done (i.e. the target), the operator can readily determine if enough media is being used. With the present invention, should the particular target require a higher or lower medium/media mixture ratio, the operator, while still blasting, can minutely adjust the ratio using the control in the pressure hose handle until the optimum ratio is obtained.

In one embodiment of the invention, the actual volume and pressure being delivered from the compressor is controlled by the operator control panel. This is achieved by venting the output from the compressor until the desire results are obtained.

Although pressure and media mixtures are two important factors, those of ordinary skill in the art recognize that other variables associated with a pressure application operation are best controlled at the blast head. The operator's control panel in the pressure hose handle permits this.

The invention, with various of its embodiments will be more fully explained by the accompanying drawings and their following descriptions.

DRAWINGS IN BRIEF

DRAWINGS IN DETAIL

Figure 1:
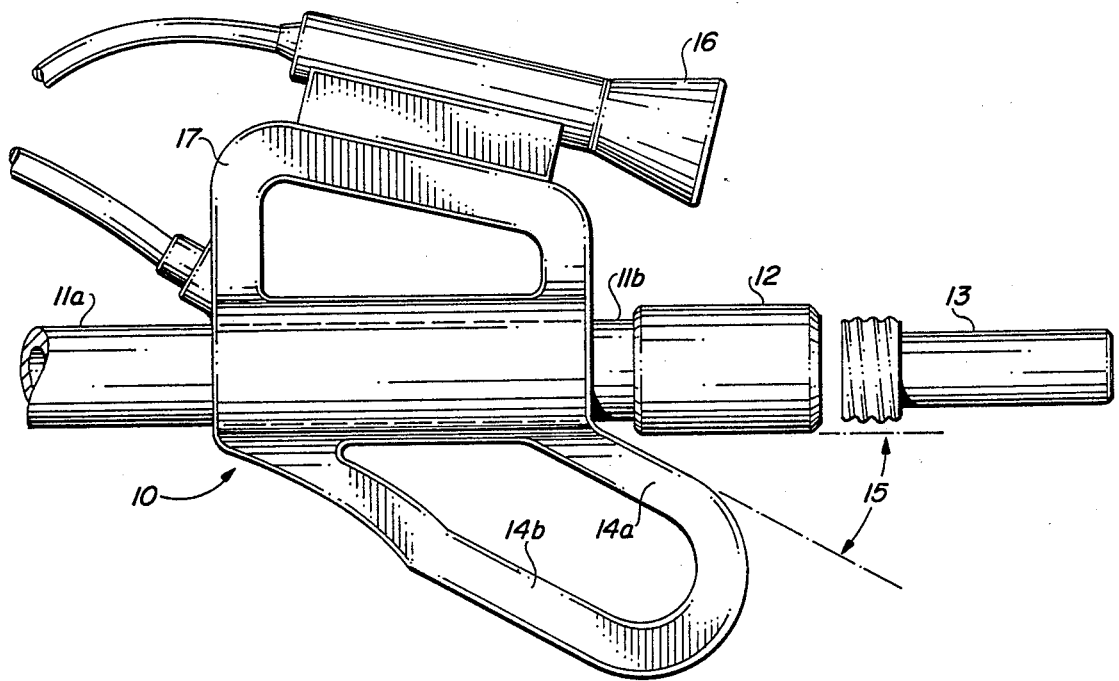
FIG. 1 is a side view of an embodiment of the operator's handle.

FIG. 1 illustrates an embodiment of the invention where the nozzle is used as the stop. Operator's handle 10 encircles pressure hose 11a. Handle 10 does not crimp or bind hose 11a permitting it to extend past the handle as illustrated by hose portion 11b. When hose 11a is pressurized, hose 11a naturally withdraws until nozzle holder/stop 12 presses against handle 10 (not shown). At this point, the hose portion 11b ceases to be visible.

Stop 12 is a nozzle holder adapting nozzle 13 to hose 11a. In this fashion, stop 12 serves two distinct functions, it retains nozzle 13 while also maintaining the longitudinal position of handle 10 during hose pressurization.

Handle 10 additionally has a grip 14a and 14b. This grip is positioned to create a reverse angle being an acute angle illustrated by angle 15. In the preferred embodiment of this invention, angle 15 is twenty-seven degrees. Those of ordinary skill in the art readily recognize other angles which are equally acceptable for this application.

Another grip 17, on the top of the handle, is designed to permit the operator to move the hose by dragging it behind him. This grip 17 is used primarily when the hose is being hauled to a new location before pressurized applications are to commence.

The grip 17 also provides a mounting surface for a high intensity light source 16. The angle provided by grip 17 directs the light onto the target area in front of nozzle 13.

For application, hose 11a is rested upon the operator's shoulder. The operator grips either grip 14a or 14b to maintain and control the direction of the nozzle 13.

Because of the swivel nature of handle 10, it can also be rotated 180 degrees. This places grip 14a and 14b at the "top" of the pressure hose and permits the operator to use grips 14a and 14b for waist high blasting.

The operator's handle of FIG. 1 is permitted to "float" freely around the pressure hose yet provides for the positive movement necessary for pressurized operations. The floating ability and the reverse angle grip both contribute to reducing operator fatigue. A less fatigued operator can more accurately control the nozzle, is less likely to create an accident, is less likely to inadvertently harm the target, and can work longer periods without breaks.

Figure 2:
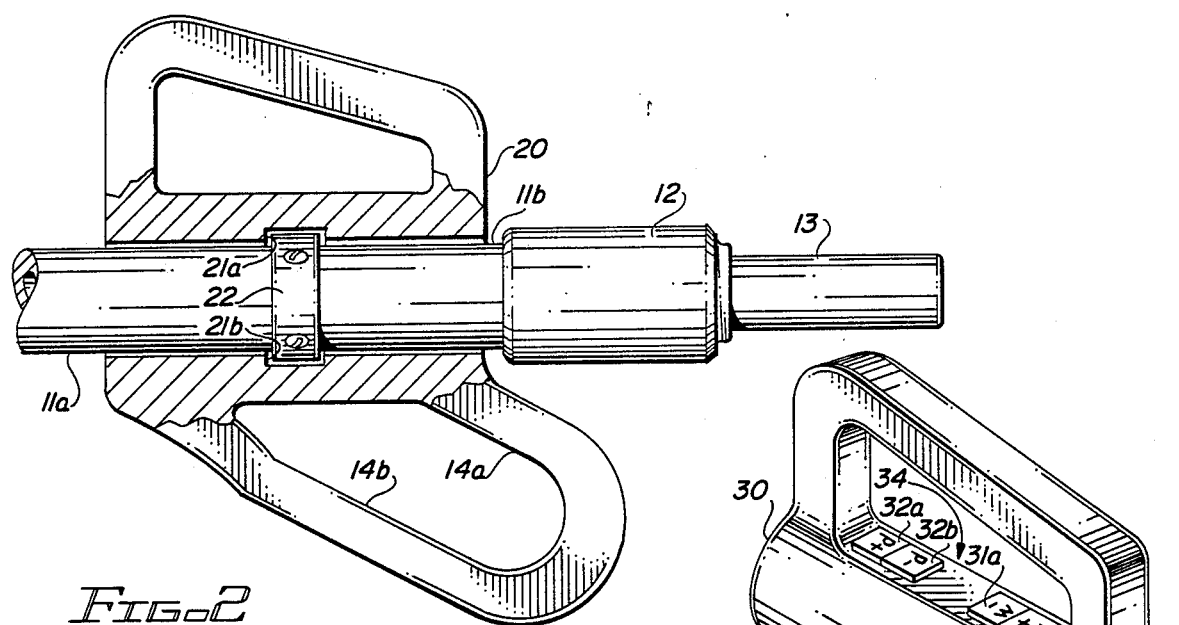
FIG. 2 is a cut-away view of a second embodiment of the operator's handle.

FIG. 2 illustrates a cutaway view of another embodiment of the invention. Handle 20 has a reverse angle grip 14a and 14b. Nozzle 13 is attached to hose 11a by attachment 12. In this embodiment of the invention, the stop function is provided by ring 22 which fits into an internal groove 21a and 21b.

In this embodiment of the invention, the hose extension illustrated by 11b can be fixed or eliminated, even during pressurization of the hose, since the stop ring 22 does not permit the hose to be withdrawn.

Ring 22 is rigidly attached to hose 11a and is not bound or crimped by the handle 20. Again, free rotation of handle 20 around hose 11a is permitted.

Since the operator's handle can be placed at any location along pressure hose 11a, this embodiment is especially useful when placement of the handle at the end of the pressure hose is not desired. One such example would be the use of nozzle 13 in a confined area which otherwise would not be accessible should the handle be proximate to the nozzle.

Figure 3:
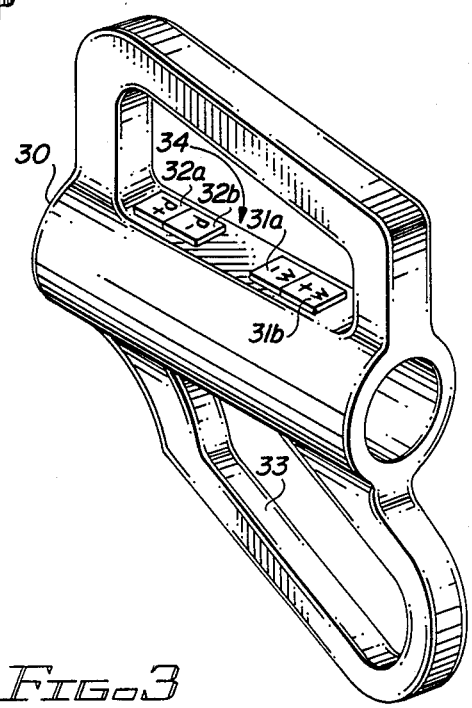
FIG. 3 is a pictorial view of an embodiment of the operator's handle illustrating the control panel and dead-man switch.

FIG. 3 is a pictorial view of an embodiment of the invention illustrating the dead-man switch and the operator control panel.

As described earlier, the purpose of the dead-man switch is to eliminate the pressure within the hose when the operator has finished a task or is no longer in control of the handle. Because of this, the dead-man switch 33 is located on the reverse angle grip 35. It is the reverse angle grip 35 that is held by the operator during normal over the shoulder operation and when the handle is swiveled to the top position for waist height application.

While the hose is directed via handle 35, the operator's free hand can easily manipulate the operator control panel 34. In this embodiment, operator control panel 34 contains two types of controls. Medium pressure may be increased or decreased by switches 32a and 32b, respectively. The density or ratio of media going through the hose is increased or decreased by switches 31a and 31b respectively. Those of ordinary skill in the art readily recognize other types of control which are also applicable.

In one embodiment of the invention, the switches 31a, 31b, 32a, and 32b, are electrical switches which communicate to a controller either by hard wires or by radio signals. Another embodiment of the invention utilizes a pneumatic system where the switches 31a, 31b, 32a, and 32b adjust pneumatic pressure to control the remote valves.

In either case, the operator control panel 34 permits the operator, with one hand, to minutely adjust application parameters. This capability, previously not available, greatly enhances pressure hose applications. Through visual feedback from a target, the operator can perceive the effects of his/her actions and can take immediate steps to optimize such effects on a target.

Figure 4:
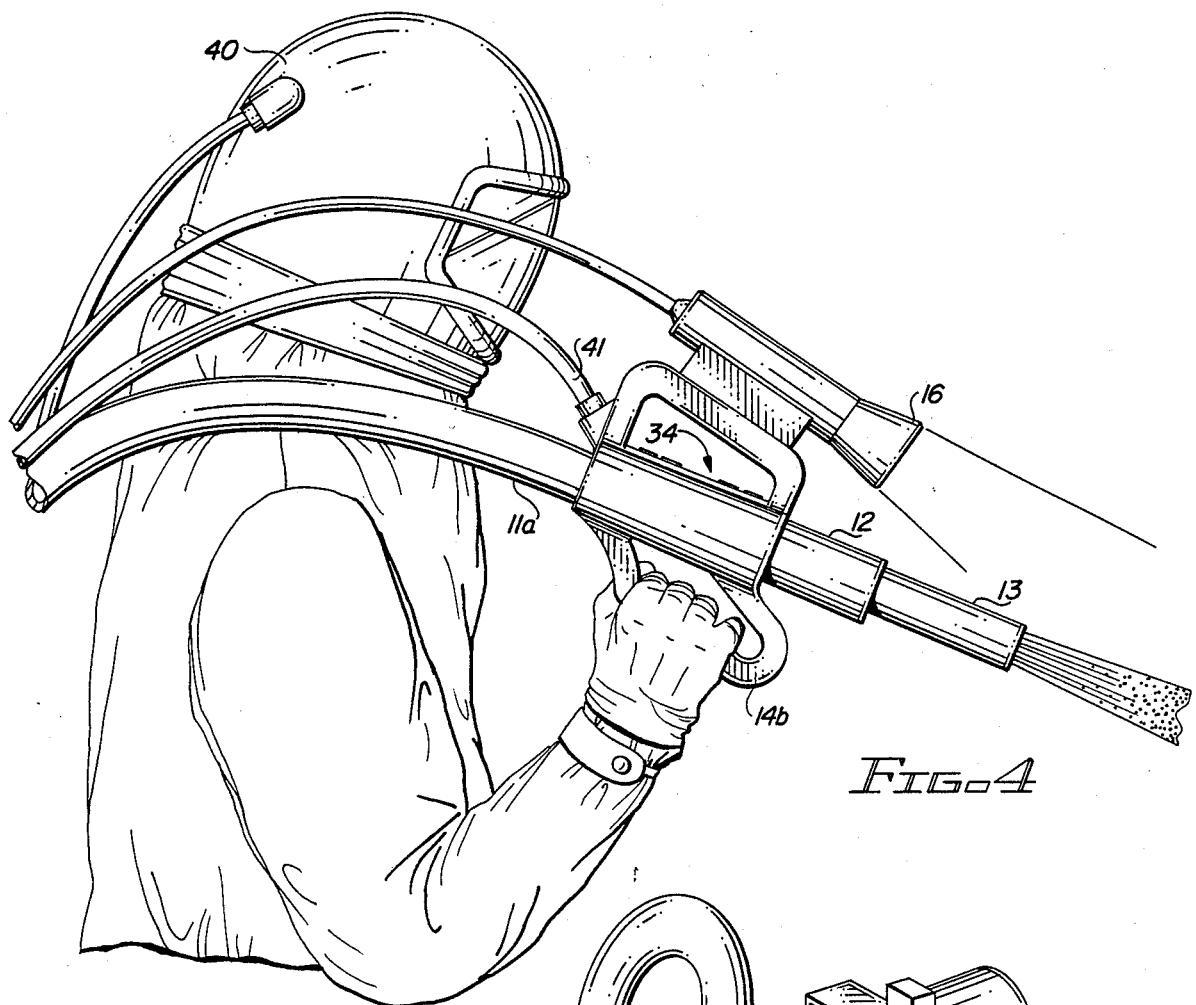
FIG. 4 is a side view of an embodiment of the invention in use.

FIG. 4 pictorially illustrates an embodiment of the invention in use. Operator 40 carries the pressure blast hose 11a over his/her shoulder and is controlling the direction of application with one hand via grip 14b.

Since the other hand is free, it can manipulate the operator control panel 34 to obtain optimum application. The signal or data from the operator control panel (whether electrical or pneumatic) are communicated via cable 41 to the servo mechanisms or other devices (not shown) which make the appropriate adjustments.

Cable 41 also carries the signal from the dead-man switch on grip 14b (not shown).

The pressurized media from nozzle 13 strikes the target which is illuminated by light 16.

In this manner, the operator, with minimal physical exertion, controls all operating parameters at the nozzle head.

Figure 5:
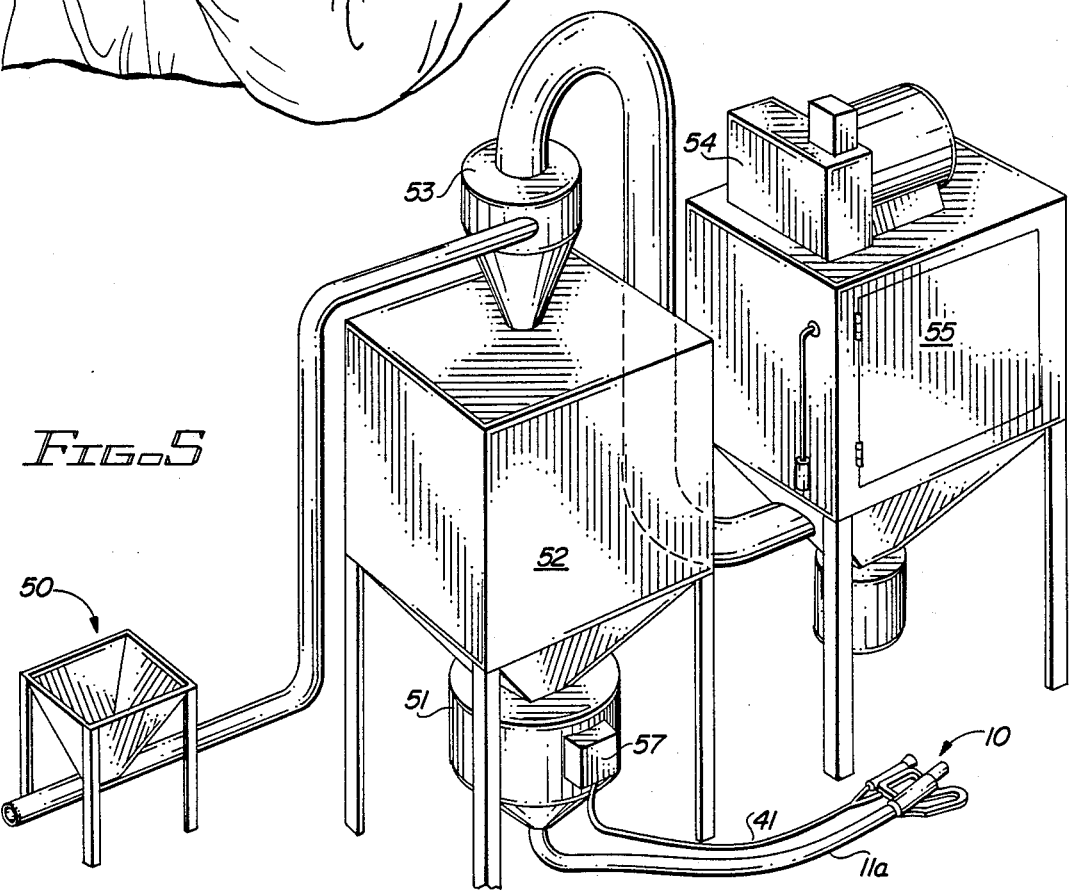
FIG. 5 is a pictorial layout of an embodiment of the invention as used in a blasting environment.

FIG. 5 is a pictorial representation of an embodiment of the present invention for a media blasting system.

In this embodiment of the invention, the controls in the operator's handle 10 sends signals to the control mechanism 57 through communication line 41. The control mechanism 57 controls medium pressure and medium/media ratios.

In this operation, the media for the blasting operation is loaded in collection hopper 50 from which it is conveyed by vacuum pressure fan 54 to cyclone separator 53. At cyclone separator 53, the media is separated into usable media and unusable material. The usable media goes into the media storage hopper 52.

An air compressor, not shown, provides both air to pressurize blast pot 51 and air to carry media into blast pressure hose 11a.

In this manner, an entire blasting operation is controlled from the blast handle. The operator performing the blasting operation has full and complete control over all blasting parameters.

It is clear from the forgoing that the present invention creates a unique device permitting blasting or pressurized application of both medium and media in a manner heretofore not attainable and with a degree of control that can preclude or minimize damage to sensitive substrates and other targets.

What is claimed is:

1. handle system for a pressure hose comprising:
   (a) a stop mechanism attached substantially at a first end of the pressure hose;
   (b) an operator's handle totally enclosing said stop mechanism, said handle encircling said hose such that said hose rotates within said handle, and wherein said stop mechanism presses against said handle during pressurization of said hose; and,
   (c) a dead-man switch located on said operator's handle and wherein pressure within said pressure hose is reduced during deactivation of said dead-man switch.

2. A pressurized system for delivery of a selected substance by means of a medium under pressure, said system comprising:
   (a) storage means for containment of said selected substance;
   (b) means for pressurizing the medium material;
   (c) mixing means for selectively mixing the selected substance from said storage means and the medium from said means for pressurizing;
   (d) a hose having a first end and a second end, said first end communicating with said mixing means for transferance of the mixed selected substance and medium;
   (e) a stop mechanism disposed substantially at the second end of said hose;
   (f) an operator's handle wherein said stop mechanism is totally contained within said operator's handle, said operator's handle being rotatably mounted to said hose such that pressurization of said hose causes said stop mechanism to press against said handle;
   (g) a dead-man switch attached to said operator's handle and wherein deactivation of said dead-man switch deactivates said means for pressurizing; and,
   (h) a lighting means attached to said operator's handle and disposed to illuminate past the second end of said hose.

3. A particle blasting system for delivery of an abrasive substance by means of pressurized air, said system comprising:
   (a) storage means for containment of said abrasive substance;
   (b) means for pressurizing air;
   (c) mixing means for selectively mixing the abrasive substance from said storage means and the pressurized air;
   (d) a hose having a first end and a second end, said first end communicating with said mixing means for transferance of the air/abrasive;
   (e) a stop mechanism disposed substantially at the second end of said hose;
   (f) an operator's handle totally enclosing said stop mechanism and being rotatably mounted to said hose such that pressurization of said hose causes said stop mechanism to press against said operator's handle;
   (g) a dead-man switch attached to said operator's handle and wherein deactivation of said dead-man switch deactivates said means for pressurizing the air; operator's
   (h) a lighting means attached to said operator's handle and disposed to illuminate past the second end of said hose.

* * * * *